(12) United States Patent
Huang et al.

(10) Patent No.: US 12,027,089 B2
(45) Date of Patent: Jul. 2, 2024

(54) ELECTRONIC DEVICE AND REFRESH RATE ADJUSTING METHOD THEREOF

(71) Applicant: ASUSTeK COMPUTER INC., Taipei (TW)

(72) Inventors: Yu-Chi Huang, Taipei (TW); Chih-Hsien Yang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 17/980,525

(22) Filed: Nov. 3, 2022

(65) Prior Publication Data

US 2023/0377500 A1 Nov. 23, 2023

(30) Foreign Application Priority Data

May 20, 2022 (TW) .................................. 111118933

(51) Int. Cl.
*G09G 3/20* (2006.01)
*G09G 5/00* (2006.01)
*G06F 1/3234* (2019.01)
*G06F 9/451* (2018.01)

(52) U.S. Cl.
CPC ............. *G09G 3/20* (2013.01); *G06F 1/3265* (2013.01); *G06F 9/451* (2018.02); *G09G 3/2096* (2013.01); *G09G 5/003* (2013.01); *G09G 5/006* (2013.01); *G09G 2310/08* (2013.01); *G09G 2320/0613* (2013.01); *G09G 2330/021* (2013.01); *G09G 2340/0435* (2013.01)

(58) Field of Classification Search
CPC ............. G09G 3/20; G09G 2320/0613; G09G 2330/021; G09G 2340/0435; G09G 3/2096; G09G 5/003; G09G 5/006; G09G 2310/08; G06F 1/3265; G06F 9/451
See application file for complete search history.

(56) References Cited

U.S. PATENT DOCUMENTS

| 9,905,199 B2 | 2/2018 | Liu et al. |
| 2016/0078846 A1 | 3/2016 | Liu et al. |
| 2021/0225320 A1* | 7/2021 | Sin .......................... G09G 5/003 |

FOREIGN PATENT DOCUMENTS

| CN | 101894513 | | 6/2012 | |
| CN | 109104638 A | * | 12/2018 | ............. A63F 13/52 |
| CN | 112083988 | | 12/2020 | |
| TW | 201621808 | | 6/2016 | |

* cited by examiner

*Primary Examiner* — Douglas M Wilson
(74) *Attorney, Agent, or Firm* — JCIPRNET

(57) ABSTRACT

An electronic device and a refresh rate adjusting method of the electronic device are provided. The refresh rate adjusting method is adapted to the electronic device including a display, and the method includes following steps. During a period in which an application is executed in a foreground, a frame update status of the application is monitored, and a plurality of frame update rates of the application are recorded. In response to the application executed in the foreground, a refresh rate of the display is determined according to a statistical value of the frame update rates of the application. The display is controlled to display application frames of the application according to the refresh rate.

12 Claims, 5 Drawing Sheets

ELECTRONIC DEVICE AND REFRESH RATE ADJUSTING METHOD THEREOF

CROSS-REFERENCE TO RELATED APPLICATION

This application claims the priority benefit of Taiwan application serial no. 111118933, filed on May 20, 2022. The entirety of the above-mentioned patent application is hereby incorporated by reference herein and made a part of this specification.

BACKGROUND

Technical Field

The disclosure relates to an electronic device and a refresh rate adjusting method thereof.

Description of Related Art

At present, although a display of an electronic device is able support update rates of a plurality of frames, a user is required to manually adjust the frame update rate of the display. To be specific, the frame rates supported by various applications are not constant. Therefore, the user should know the actual frame rate supported by the application, so that the user is allowed to manually set the frame update rate of the display to conform to the frame rate supported by the application to ensure the application frame to achieve optimal display effects. However, if the user is unaware of the actual frame rate supported by the application, the user may need to repeatedly set the frame update rate of the display to different values in an attempt to adjust the frame update rate of the display to an ideal state. In addition, if the user sets the frame update rate to a higher frame rate than the frame rate supported by the application, it may lead to unnecessary power consumption.

SUMMARY

According to the first aspect of this disclosure, a refresh rate adjusting method adapted to an electronic device is provided. The refresh rate adjusting method includes a display and includes following steps. During a period in which an application is executed in a foreground, a frame update status of the application is monitored, and a plurality of frame update rates of the application are recorded. In response to the application executed in the foreground, a refresh rate of the display is determined according to a statistical value of the frame update rates of the application. The display is controlled to display application frames of the application according to the refresh rate.

According to the second aspect of this disclosure, an electronic device is provided. The electronic device includes a display, a storage device, and a processor. The storage device records a plurality of modules. The processor is coupled to the display and the storage device and executes the modules to perform following steps. During a period in which an application is executed in a foreground, a frame update status of the application is monitored, and a plurality of frame update rates of the application are recorded. In response to the application executed in the foreground, a refresh rate of the display is determined according to a statistical value of the frame update rates of the application. The display is controlled to display application frames of the application according to the refresh rate.

In view of the above, an update rate record including the frame update rates of the application is generated by monitoring the frame update status of the application, so as to automatically adjust the refresh rate of the display according to the update rate record in response to the application executed in the foreground. Thereby, the user may ensure the optimal display effects of the application frames in no need of manually adjusting the refresh rate of the display in response to different applications.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
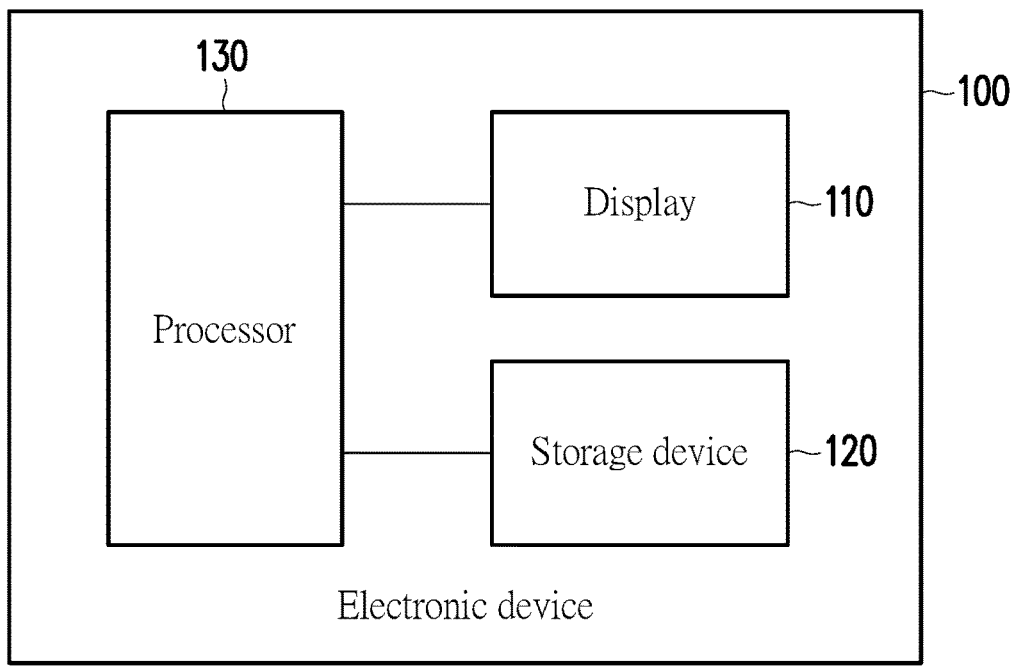
FIG. 1 is a schematic view of an electronic device according to an embodiment of the disclosure.

Reference is now made in detail to exemplary embodiments of the disclosure, and examples of the exemplary embodiments are described in the accompanying drawings. Whenever possible, the same element symbols are used in the drawings and descriptions to indicate the same or similar parts.

FIG. 1 is a block view of an electronic device according to an embodiment of the disclosure. With reference to FIG. 1, an electronic device 100 in this embodiment is, for instance, an electronic device with a display function, such as a smart phone, a personal digital assistant (PDA), a tablet computer, an electronic book, a game console, a notebook computer, and so on, which should not be construed as a limitation in the disclosure. The electronic device 100 includes a display 110, a storage device 120, and a processor 130. The processor 130 is coupled to the display 110 and the storage device 120, and functions thereof are respectively described below.

The display 110 is, for instance, a liquid crystal display (LCD), a light-emitting diode (LED) display, a field emission display (FED), an organic light-emitting diode display (OLED), or another kind of display, which should not be construed as a limitation in the disclosure. In some embodiments, the display 110 may support a plurality of predetermined refresh rates, and the refresh rate of the display 110 may be set as one of the predetermined refresh rates. For instance, the predetermined refresh rates are 60 Hz, 120 Hz, and 144 Hz, which should however not be construed as a limitation in the disclosure. For instance, when the refresh rate of the display 110 is set as 120 Hz, it indicates that the display 110 refreshes frames 120 times per second; when the refresh rate of the display 110 is set as 144 Hz, it indicates that the display 110 refreshes frames 144 times per second.

The storage device 120 is configured to store data, such as files, images, commands, programming codes, software modules, and so forth, and the storage device 120 may be, for instance, any type of fixed or movable random access memory (RAM), read-only memory (ROM), flash memory (flash memory), hard disk, another similar device, an integrated circuit, or a combination thereof.

The processor 130 is, for instance, a central processing unit (CPU), an application processor (AP), or any other programmable general-purpose or special-purpose microprocessor, digital signal processor (DSP), programmable controller, application specific integrated circuit (ASIC), programmable logic device (PLD), graphics processing unit (GPU), another similar device, or a combination thereof. The processor 130 may execute the programming codes, software modules, commands, and the like recorded in the storage device 120, so as to implement the refresh rate adjusting method provided in one or more embodiments of the disclosure. The software modules may be broadly interpreted as commands, command sets, codes, programming code, programs, applications, software packages, threads, procedures, functions, etc., regardless of whether the software modules are referred to as software, firmware, intermediate software, microcodes, hardware description language, or others.

In some embodiments, the electronic device 100 may execute one or a plurality of applications. When an application is executed in a foreground, the display 110 displays application frames of the application. Here, the application executed in the foreground may be referred to as a foreground application. It should be noted that different applications provide the frame content at different frequencies; that is, different applications update the application frames at different frequencies. Here, the electronic device 100 may determine the refresh rate of the display 110 according to the foreground application, so that the refresh rate of the display 110 may be automatically adjusted to be as close as possible to or the same as the frame rate supported by the foreground application, whereby the display smoothness of the application frames is improved.

Figure 2:
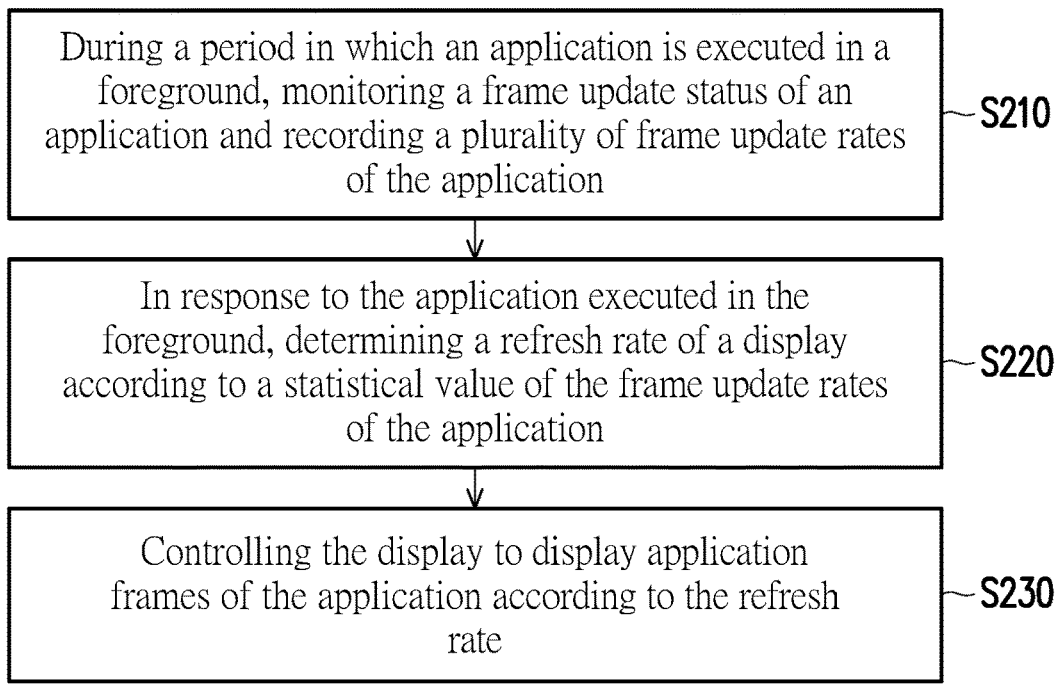
FIG. 2 is a flowchart of a refresh rate adjusting method according to an embodiment of the disclosure.

FIG. 2 is a flowchart of a refresh rate adjusting method according to an embodiment of the disclosure. With reference to FIG. 1 and FIG. 2, the refresh rate adjusting method provided in this embodiment is adapted to the electronic device 100 provided in the previous embodiment, and detailed steps of the refresh rate adjusting method provided in this embodiment are elaborated hereinafter with reference to various elements in the electronic device 100.

In step S210, during a period in which an application is executed in a foreground, the processor 130 monitors a frame update status of the application and records a plurality of frame update rates of the application. In detail, when the application is executed in the foreground, the application continuously provides the frame content of the application frames, so that the display 110 may display the application frames of the application. When the application is executed in the foreground, the processor 130 continuously monitors the frame update status of the application to know whether the application is not able to provide the frame content in real time. If the application cannot provide the frame content in real time, it indicates that the drawing speed of the application may not keep up with the refresh rate of the display 110. In some embodiments, the processor 130 may monitor the number of times of updating the application frames by the application every other unit time period (e.g., 1 second).

In some embodiments, by continuously monitoring the frame update status of the application, the processor 130 may obtain an actual frame update rate of the application within a unit time period. In some embodiments, the actual frame update rate may include an average number of times of updating the application frames. For instance, the processor 130 may monitor the number of times of updating the application frames by the application in every other second. After 30 seconds, the processor 130 may obtain 30 updating times. In addition, the processor 130 may perform an average calculating operation on the 30 updating times, so as to update an average number of times of updating the application frames by the application within 1 second. After that, the processor 130 may generate a frame update rate in an update rate record of the application according to the actual frame update rate. By continuously recording the frame update rates of the application, the update rate record of the application may include the recorded frame update rates.

Figure 3:
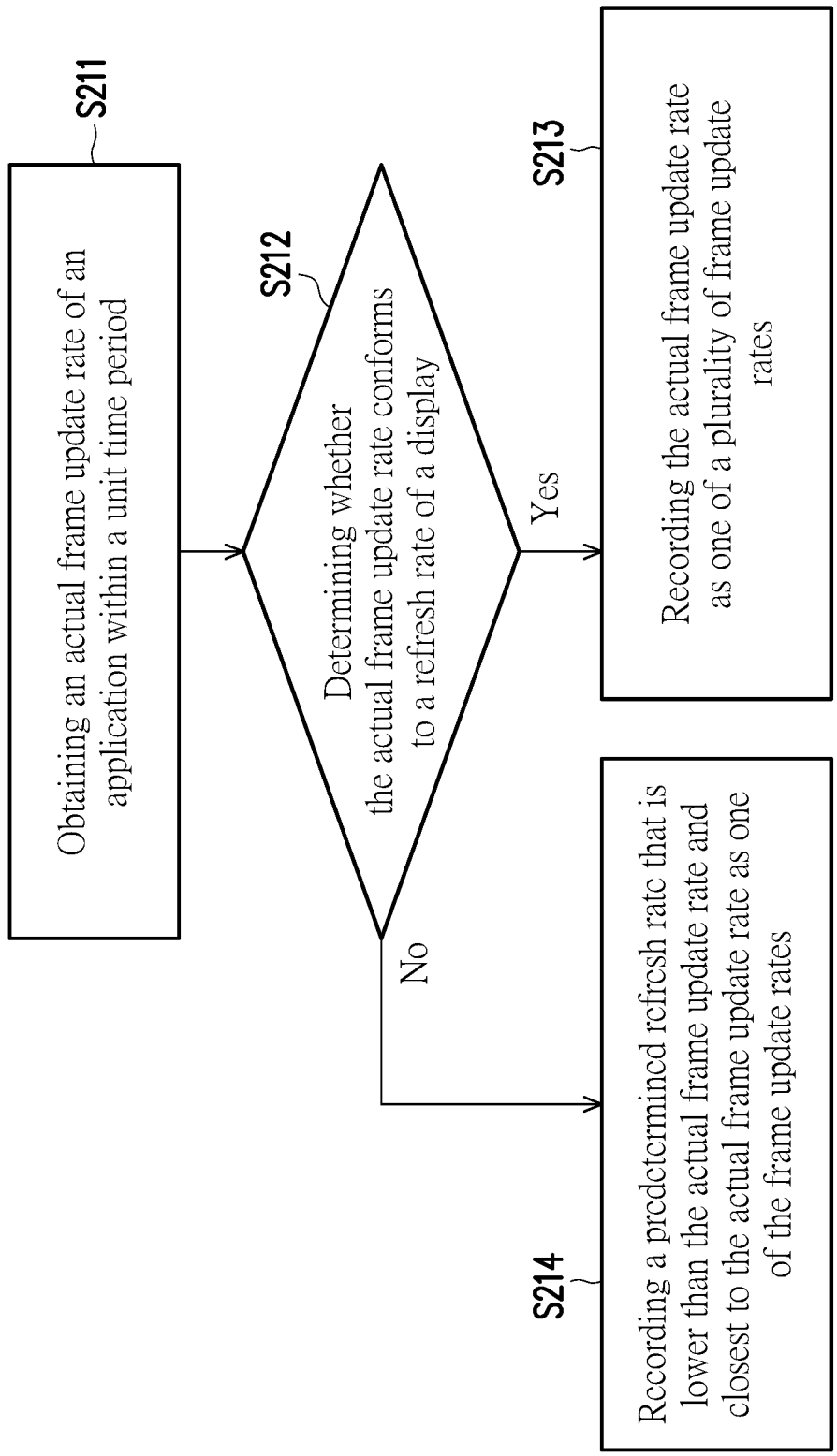
FIG. 3 is a flowchart of recording a plurality of frame update rates according to an embodiment of the disclosure.

Specifically, FIG. 3 is a flowchart of recording a plurality of frame update rates according to an embodiment of the disclosure. With reference to FIG. 3, in some embodiments, step S210 shown in FIG. 2 may be implemented as step S211 to step S214 in FIG. 3.

In step S211, the processor 130 obtains the actual frame update rate of the application within the unit time period. In some embodiments, whenever the application is executed in the foreground, the processor 130 starts to periodically count the number of times of updating the application frames by the application every other unit time period. Here, the number of times of updating the application frames counted every other unit time period may also be regarded as the frame rate based on the unit time period. After that, in response to the application which is closed or switched to be executed in a background, the processor 130 may perform an average calculating operation on the number of updating times to obtain the actual frame update rate. For instance, before the application is switched to be executed in the background, the processor 130 may obtain 10 updating times FPS1-FPS10. After that, in response to the application which is switched to be executed in the background, the processor 130 may calculate the average of the 10 updating times FPS1-FPS10 to obtain the actual frame update rate of the application.

In step S212, the processor 130 determines whether the actual frame update rate conforms to the refresh rate of the display 110. In some embodiments, the processor 130 determines whether the difference between the actual frame update rate and the refresh rate of the display 110 is less than a predetermined threshold. If the difference between the actual frame update rate and the refresh rate of the display 110 is less than the predetermined threshold, the processor 130 determines that the actual frame update rate conforms to the refresh rate of the display 110. By contrast, if the difference between the actual frame update rate and the refresh rate of the display 110 is not smaller than the predetermined threshold, the processor 130 determines that the actual frame update rate does not conform to the refresh rate of the display 110. Alternately, in some embodiments, the processor 130 determines whether the actual frame update rate is equal to the refresh rate of the display 110. If the actual frame update rate is equal to the refresh rate of the display 110, the processor 130 determines that the actual frame update rate conforms to the refresh rate of the display 110. By contrast, if the actual frame update rate is not equal to the refresh rate of the display 110, the processor 130 determines that the actual frame update rate does not conform to the refresh rate of the display 110.

If the actual frame update rate conforms to the refresh rate of the display 110 (determined as "Yes" in step S212), in step S213, the processor 130 records the actual frame update rate as one of the frame update rates. Specifically, if the actual frame update rate conforms to the refresh rate of the display 110, it indicates that the drawing speed of the application may keep up with the refresh rate of the display 110; therefore, the actual frame update rate may be recorded in the update rate record of the application as a reference for subsequently adjusting and setting the refresh rate of the display 110.

In another aspect, if the actual frame update rate does not conform to the refresh rate of the display 110 (determined as "No" in step S212), in step S214, the processor 130 records the predetermined refresh rate that is lower than the actual frame update rate and closest to the actual frame update rate as one of the frame update rates. Specifically, if the actual frame update rate does not conform to the refresh rate of the display 110, it indicates that the drawing speed of the application may not keep up with the refresh rate of the display 110. Therefore, when the display 110 supports a plurality of predetermined refresh rates, the processor 130 records the predetermined refresh rate which is lower than the actual frame update rate and closest to the actual frame update rate into the update rate record of the application as a reference for subsequently adjusting and setting the refresh rate of the display 110. For instance, if it is assumed that the refresh rate of the display 110 is set as 144 Hz but the actual frame update rate is 130 Hz, the processor 110 may record the predetermined refresh rate of 120 Hz which is lower than the actual frame update rate and closest to the actual frame update rate as one of the frame update rates. From the above, it may be learned that the processor 130 may generate the update rate record of the application based on whether the drawing speed of the application may keep up with the refresh rate of the display 110.

As shown in FIG. 2, in step S220, in response to the application executed in the foreground, the processor 130 determines the refresh rate of the display 110 according to a statistical value of the frame update rates of the application. The statistical value may be the average value, the maximum value, the median, the mode, or the like. Next, in step S230, the processor 130 controls the display 110 to display the application frames of the application according to the refresh rate. Specifically, whenever the application is opened or switched to be executed in the foreground from the background, the processor 130 may reset the refresh rate of the display 110 according to the recorded statistical value of the frame update rates, so as to control the display 110 to display the application frames of the application according to a reset refresh rate.

It is worth mentioning that, in some embodiments, during a period in which another application is executed in the foreground, the processor 130 may monitor the frame update status of the another application and record a plurality of frame update rates of the another application. Moreover, in response to the another application executed in the foreground, the processor 130 may determine the refresh rate of the display 110 according to a statistical value of the frame update rates of the another application. In other words, the processor 130 may generate different update rate record respectively corresponding to different applications. Therefore, in response to the change of the foreground application, the processor 130 may automatically reset the refresh rate of the display 110 according to the update rate record corresponding to the foreground application.

Figure 4:
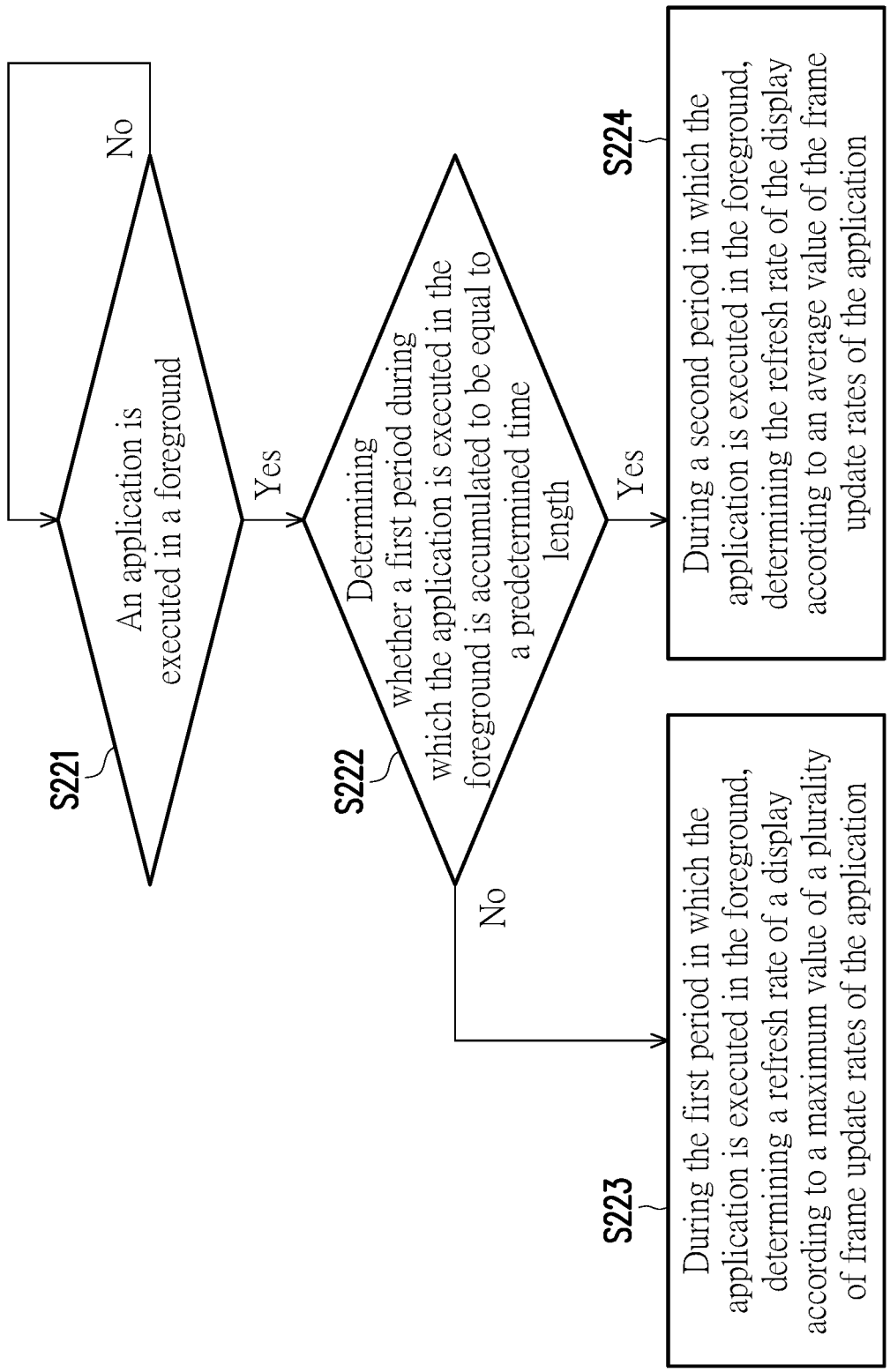
FIG. 4 is a flowchart of determining a refresh rate of a display according to an embodiment of the disclosure.

In addition, in some embodiments, the processor 130 may apply different statistical values to set the refresh rate of the display 110 in different time periods. In detail, FIG. 4 is a flowchart of determining a refresh rate of a display according to an embodiment of the disclosure. With reference to FIG. 4, in some embodiments, step S220 shown in FIG. 2 may be implemented as step S221-step S223 in FIG. 4.

In step S221, the processor 130 determines whether the application is executed in the foreground. In response to the application executed in the foreground (determined as "Yes" in step S221), in step S222, the processor 130 determines whether a first period during which the application is executed in the foreground is accumulated to be equal to a predetermined time length. For instance, the predetermined time length may be one hour, which should however not be construed as a limitation in the disclosure. Specifically, when the application is executed in the foreground for the first time, the processor 130 starts to perform a timing operation on the first period during which the application is executed in the foreground. It should be noted that, before the first period is accumulated to be equal to the predetermined time length, even if the application is repeatedly switched to be executed in the foreground from the background and vice versa, the processor 130 continues to perform the timing operation and accumulates the first period during which the application is executed in the foreground.

If the first period has not been accumulated to be equal to the predetermined time length (determined as "No" in step S221), in step S223, during the first period in which the application is executed in the foreground, the processor 130 determines the refresh rate of the display 110 according to the maximum value of the frame update rates of the application. Specifically, the processor 130 may look up the update rate record of the application to obtain the maximum value of the recorded frame update rates. By determining the refresh rate of the display 110 according to the maximum value of the frame update rates, the refresh rate of the display 110 may be increased during the first period in which the application is executed in the foreground. It should be noted that after the attempt to increase the refresh rate of the display 110, the processor 130 continues to monitor the frame update status of the application and generate the update rate record of the application based on whether the drawing speed of the application may keep up with the refresh rate of the display 110.

In some embodiments, the processor 130 may select a predetermined refresh rate higher than the maximum value and closest to the maximum value as the refresh rate of the display 110. For instance, it is assumed the display 110 has three predetermined refresh rates, which are 60 Hz, 120 Hz, and 144 Hz, respectively. When the maximum value of the recorded frame update rates is 120 Hz, the processor 130 selects the predetermined refresh rate of 144 Hz as the refresh rate of the display 110 in the first period.

In another aspect, if the first time period is accumulated to be equal to the predetermined time length (determined as "Yes" in step S221), in step S224, after the first period is accumulated to be equal to the predetermined time length, the processor 130 determines the refresh rate of the display 110 according to the average value of the frame update rates of the application during a second period in which the application is executed in the foreground. Specifically, the processor 130 may look up the update rate record of the application and calculate the average value of the frame update rates. In some embodiments, after the attempt to increase the refresh rate of the display 110 in the first period, the processor 130 may already know whether the drawing speed of the application may keep up with the increased refresh rate according to the frame update status of the application. Therefore, after the first period, the processor 130 may no longer attempt to increase the refresh rate of the display 110 based on the maximum value but determine the refresh rate of the display 110 according to the average value of the frame update rates.

In some embodiments, the processor 130 may select a predetermined refresh rate higher than or equal to the average value and closest to the average value as the refresh rate of the display 110. For instance, it is assumed that the display 110 has three predetermined refresh rates, which are 60 Hz, 120 Hz, and 144 Hz, respectively. When the average value of the recorded frame update rates is 118 Hz, the processor 130 selects a predetermined refresh rate of 120 Hz as the refresh rate of the display 110 in the second period.

Figure 5:
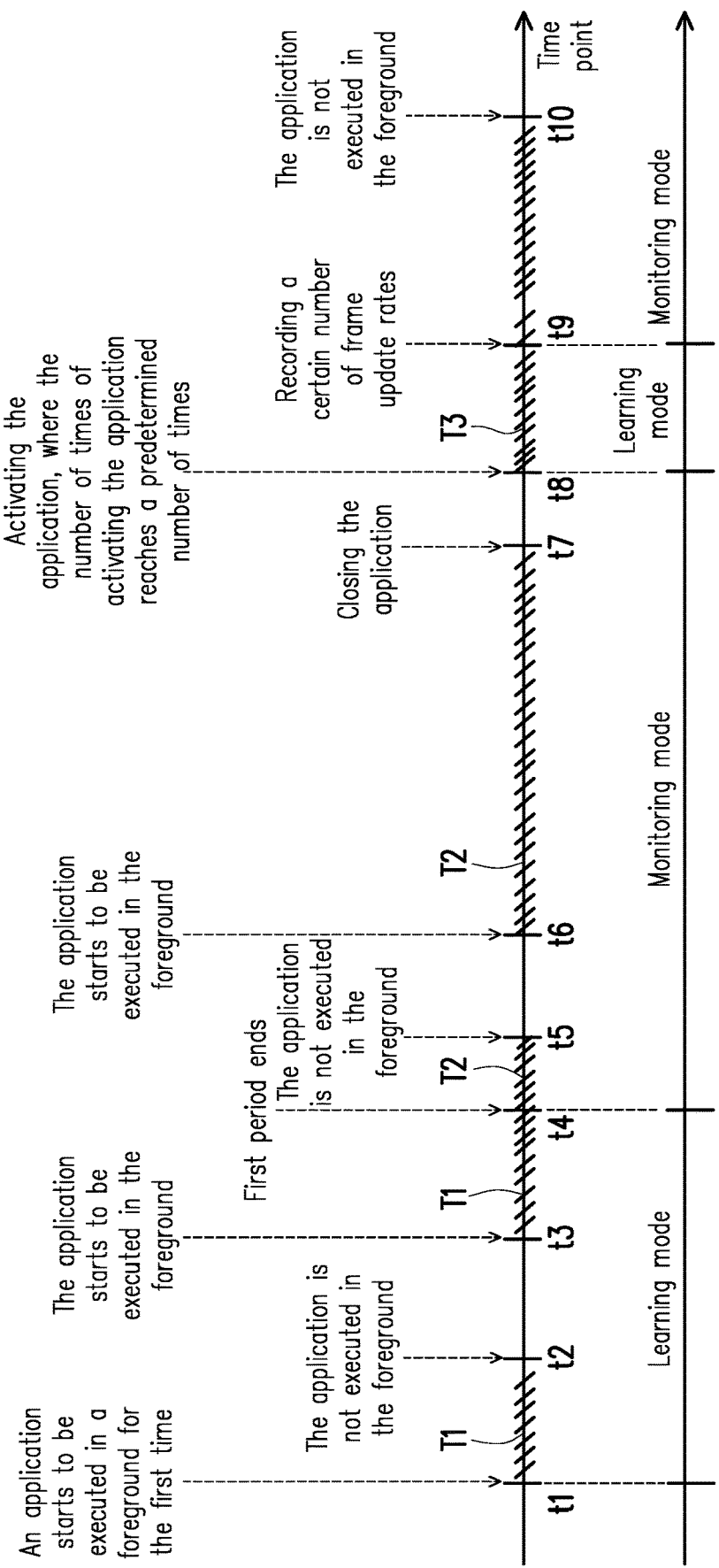
FIG. 5 is a schematic view of determining a refresh rate of a display in different time periods according to an embodiment of the disclosure.

To be specific, FIG. 5 is a schematic view of determining a refresh rate of a display in different time periods according to an embodiment of the disclosure. In this embodiment, it should be noted that the processor 130 may determine the refresh rate of the display 110 based on two different modes. In a learning mode, the processor 130 determines the refresh rate of the display 110 according to the maximum value of the frame update rates of the application. By contrast, in a monitoring mode, the processor 130 determines the refresh rate of the display 110 according to the average value of the frame update rates of the application.

According to the exemplary embodiment shown in FIG. 5, at a time point t1, the application starts to be executed in the foreground for the first time, and the processor 130 starts to perform the timing operation and accumulate the first period T1 during which the application is executed in the foreground. At a time point t2, the application is switched to be executed in the background and is executed in the foreground, and therefore the processor 130 stops accumulating the first period T1 during which the application is executed in the foreground. During the first period T1 between the time point t1 and the time point t2, since the first period T1 has not yet been accumulated to be equal to the predetermined time length, note that the processor 130 determines the refresh rate of the display 110 based on the learning mode and determines the refresh rate of the display 110 according to the maximum value of the frame update rates of the application.

At a time point t3, the application again starts to be executed in the foreground, and the processor 130 continues to perform the timing operation and accumulate the first period T1 during which the application is executed in the foreground. At a time point t4, the processor 130 determines that the first period T1 is accumulated to be equal to the predetermined time length. During the first period T1 between the time point t3 and the time point t4, since the first period T1 has not yet been accumulated to be equal to the predetermined time length, the processor 130 still determines the refresh rate of the display 110 based on the learning mode. However, during the second period T2 after the time point t4, the processor 130 may switch from the learning mode to the monitoring mode. At a time point t5, the application is switched to be executed in the background rather than being executed in the foreground.

At a time point t6, the application starts to be executed in the foreground. At a time point t7, the application is closed and not executed in the foreground. During the first period T2 between the time point t6 and the time point t7, since the first period T1 has been accumulated to be equal to the predetermined time length, note that the processor 130 determines the refresh rate of the display 110 based on the monitoring mode and determines the refresh rate of the display 110 according to the average value of the frame update rates of the application.

In addition, during the first period T1 and the second period T2, the application is executed in the foreground, and the processor 130 monitors the frame update status of the application and records the frame update rates of the application. In some embodiments, when the application is switched to be executed in the background and closed, such as at the time points t2, t5, and t7, the processor 130 may generate and record a frame update rate according to the monitored frame update status. Alternately, in some embodiments, the processor 130 may cyclically generate and record the frame update rate according to the monitored frame update status during the first period T1 and the second period T2.

It is worth mentioning that, at a time point t8, in response to the number of times of activating the application reaching a predetermined number of times, during a third period T3 in which the application is executed in the foreground, the processor 130 is switched back to the learning mode from the monitoring mode and determines the refresh rate of the display 110 according to the maximum value of the frame update rates of the application. For instance, when the user activates the application in a non-execution status for 30 times, the processor 130 is switched from the monitoring mode to the learning mode. At a time point t9, the processor 130 has recorded a certain number of the frame update rates within the third period T3, so the processor 130 is switched from the learning mode back to the monitoring mode. That is, the length of the third period T3 is determined according to the number of the recorded frame update rates. For instance, after the processor 130 is switched back to the learning mode and in response to adding 10 frame update rates to the update rate record of the application, the processor 130 is switched from the learning mode back to the monitoring mode. Thereby, even if the frame rate supported by the application is changed due to program updates, the processor 130 may still adjust the refresh rate of the display 110 adaptively.

Figure 6:
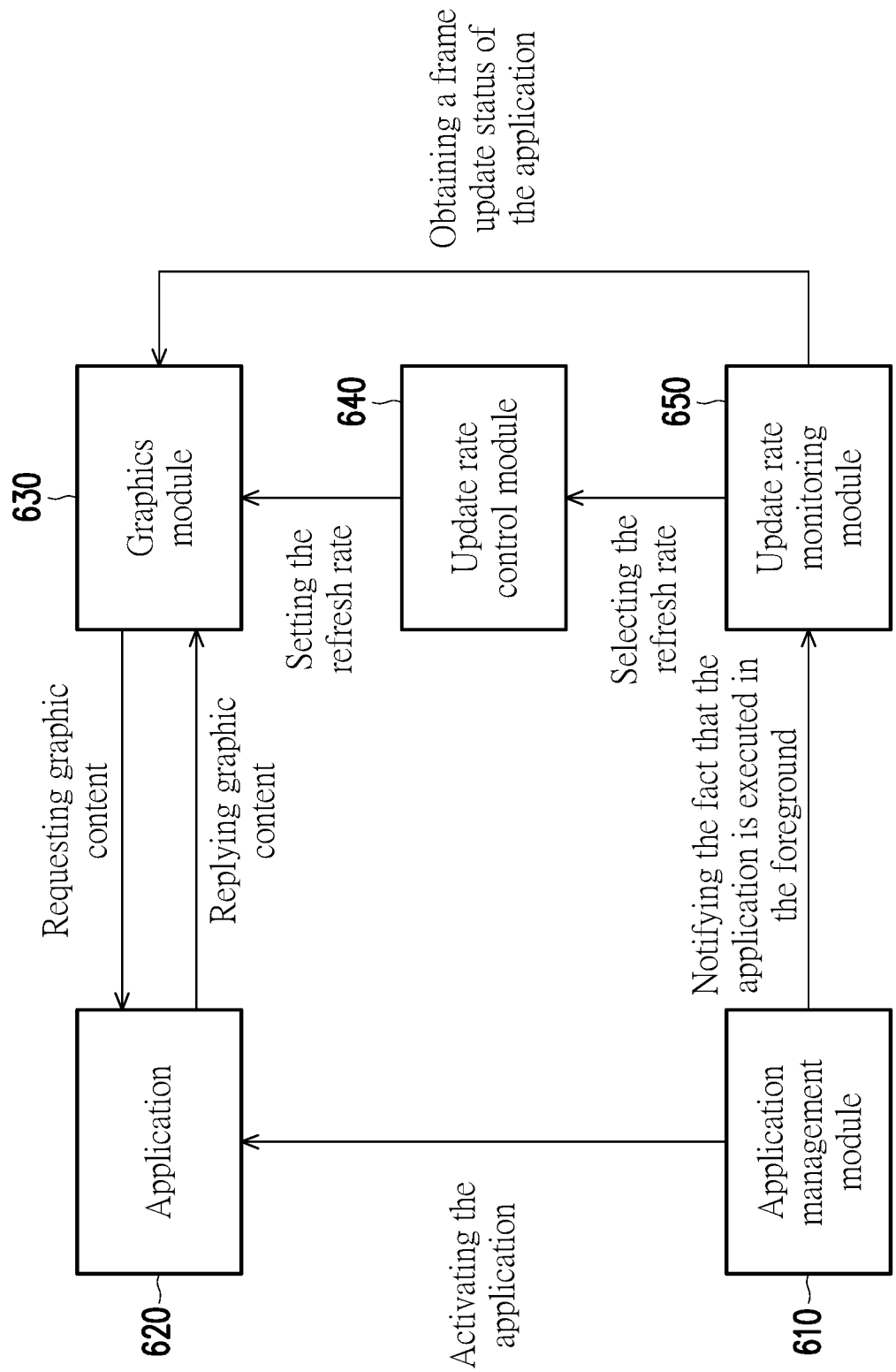
FIG. 6 is a schematic view of a refresh rate adjusting method according to an embodiment of the disclosure.

FIG. 6 is a schematic view of a refresh rate adjusting method according to an embodiment of the disclosure. With reference to FIG. 6, the refresh rate adjusting method provided in this embodiment may be implemented by executing a plurality of software modules by the processor 130, and the software modules may include an application management module 610, an application 620, a graphics module 630, an update rate control module 640, and an update rate monitoring module 650.

After the application management module 610 activates the application 620, the application management module 610 determines whether the application 620 is executed in the foreground. When the application 620 is executed in the foreground, the application management module 610 notifies the update rate monitoring module 650 of the fact that the application 620 is executed in the foreground. In addition, when the application 620 is executed in the foreground, another application (not shown in FIG. 6) is switched to be executed in the background. Therefore, in response to the application 620 executed in the foreground, the update rate monitoring module 650 may start to obtain the frame update status of the application 620 from the graphics module 630 and generate and record a frame update rate of the another application based on the frame update status of the another application.

Next, the update rate monitoring module 650 selects the refresh rate of the display 110 from a plurality of predetermined refresh rates according to the frame update rates in the update rate record of the application 620. The update rate monitoring module 650 transmits the selected refresh rate to the update rate control module 640, so that the update rate control module 640 sets the refresh rate of the display through the graphics module 630. After that, the graphics module 630 requests the application 620 to provide the graphic content associated with the application frames according to the refresh rate of the display, and the application 620 also draws the application frames and reply the graphic content to the graphics module 630.

To sum up, in one or more embodiments of the disclosure, the electronic device having the display may monitor the frame update status of the application and generate the update rate record of the application, so as to set the refresh rate of the display according to the update rate record of the application. Thereby, it is not necessary for the user to manually adjust the refresh rate of the display, and the refresh rate of the display may be automatically set to be a frame rate closest to the frame rate supported by the application, so as to optimize the display effects of the application frames. In addition, the user may be prevented from setting the refresh rate to be higher than the frame rate supported by the application, so as to reduce unnecessary power consumption.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A refresh rate adjusting method, adapted to an electronic device including a display, the refresh rate adjusting method comprising:
   monitoring a frame update status of an application and recording a plurality of frame update rates of the application during a period in which the application is executed in a foreground;
   in response to the application executed in the foreground, determining a refresh rate of the display according to a statistical value of the frame update rates of the application; and
   controlling the display to display application frames of the application according to the refresh rate, wherein during the period in which the application is executed in the foreground, the step of monitoring the frame update status of the application and recording the frame update rates of the application comprises:
   obtaining an actual frame update rate of the application within a unit time period;
   determining whether the actual frame update rate conforms to the refresh rate of the display;
      recording the actual frame update rate as one of the frame update rates if the actual frame update rate conforms to the refresh rate of the display; and
      recording a predetermined refresh rate lower than the actual frame update rate and closest to the actual frame update rate as one of the frame update rates if the actual frame update rate does not conform to the refresh rate of the display.

2. The refresh rate adjusting method according to claim 1, wherein in response to the application executed in the foreground, the step of determining the refresh rate of the display according to the statistical value of the frame update rates of the application comprises:
   determining the refresh rate of the display according to a maximum value of the frame update rates of the application during a first period in which the application is executed in the foreground.

3. The refresh rate adjusting method according to claim 2, wherein the step of determining the refresh rate of the display according to the maximum value of the frame update rates of the application comprises:
   selecting a predetermined refresh rate higher than the maximum value and closest to the maximum value as the refresh rate of the display.

4. The refresh rate adjusting method according to claim 2, wherein in response to the application executed in the foreground, the step of determining the refresh rate of the display according to the statistical value of the frame update rates of the application further comprises:
   after the first period is accumulated to be equal to a predetermined time length, during a second period in which the application is executed in the foreground, determining the refresh rate the display according to an average value of the frame update rates of the application.

5. The refresh rate adjusting method according to claim 4, wherein the step of determining the refresh rate the display according to the average value of the frame update rates of the application comprises:
   selecting a predetermined refresh rate higher than or equal to the average value and closest to the average value as the refresh rate of the display.

6. The refresh rate adjusting method according to claim 4, further comprising:
   in response to the number of times of activating the application reaching a predetermined number of times, during a third period in which the application is executed in the foreground, determining the refresh rate of the display according to the maximum value of the frame update rates of the application,
   wherein a length of the third period is determined according to a quantity of the recorded frame update rates.

7. An electronic device, comprising:
   a display;
   a storage device, recording a plurality of modules;
   a processor, coupled to the display and the storage device and executing the modules to:
   monitor a frame update status of an application and record a plurality of frame update rates of the application during a period in which the application is executed in a foreground;
   in response to the application executed in the foreground, determine a refresh rate of the display according to a statistical value of the frame update rates of the application; and
   control the display to display application frames of the application according to the refresh rate, wherein
   during a first period in which the application executed in the foreground, the processor determines the refresh rate of the display according to a maximum value of the frame update rates of the application,
   wherein after the first period is accumulated to be equal to a predetermined time length, during a second period in which the application is executed in the foreground, the processor determines the refresh rate of the display according to an average value of the frame update rates of the application.

8. The electronic device according to claim 7, wherein the processor obtains an actual frame update rate of the application within a unit time period and determines whether the actual frame update rate conforms to the refresh rate of the display, and the processor records the actual frame update rate as one of the frame update rates if the actual frame update rate conforms to the refresh rate of the display.

9. The electronic device according to claim 8, wherein the processor records a predetermined refresh rate lower than the actual frame update rate and closest to the actual frame update rate as one of frame update rates if the actual frame update rate does not conform to the refresh rate of the display.

10. The electronic device according to claim 7, wherein the processor selects a predetermined refresh rate higher than the maximum value of the frame update rates of the application and closest to the maximum value of the frame update rates of the application as the refresh rate of the display.

11. The electronic device according to claim 7, wherein the processor selects a predetermined refresh rate higher than or equal to the average value and closest to the average value as the refresh rate of the display.

12. The electronic device according to claim 7, wherein in response to the number of times of activating the application reaching a predetermined number of times, during a third period in which the application is executed in the foreground, the processor determines the refresh rate of the display according to the maximum value of the frame update rates of the application, wherein a length of the third period is determined according to a quantity of the recorded frame update rates.

* * * * *